O. G. STOLZ.
FILM SPLICING DEVICE.
APPLICATION FILED DEC. 17, 1917.

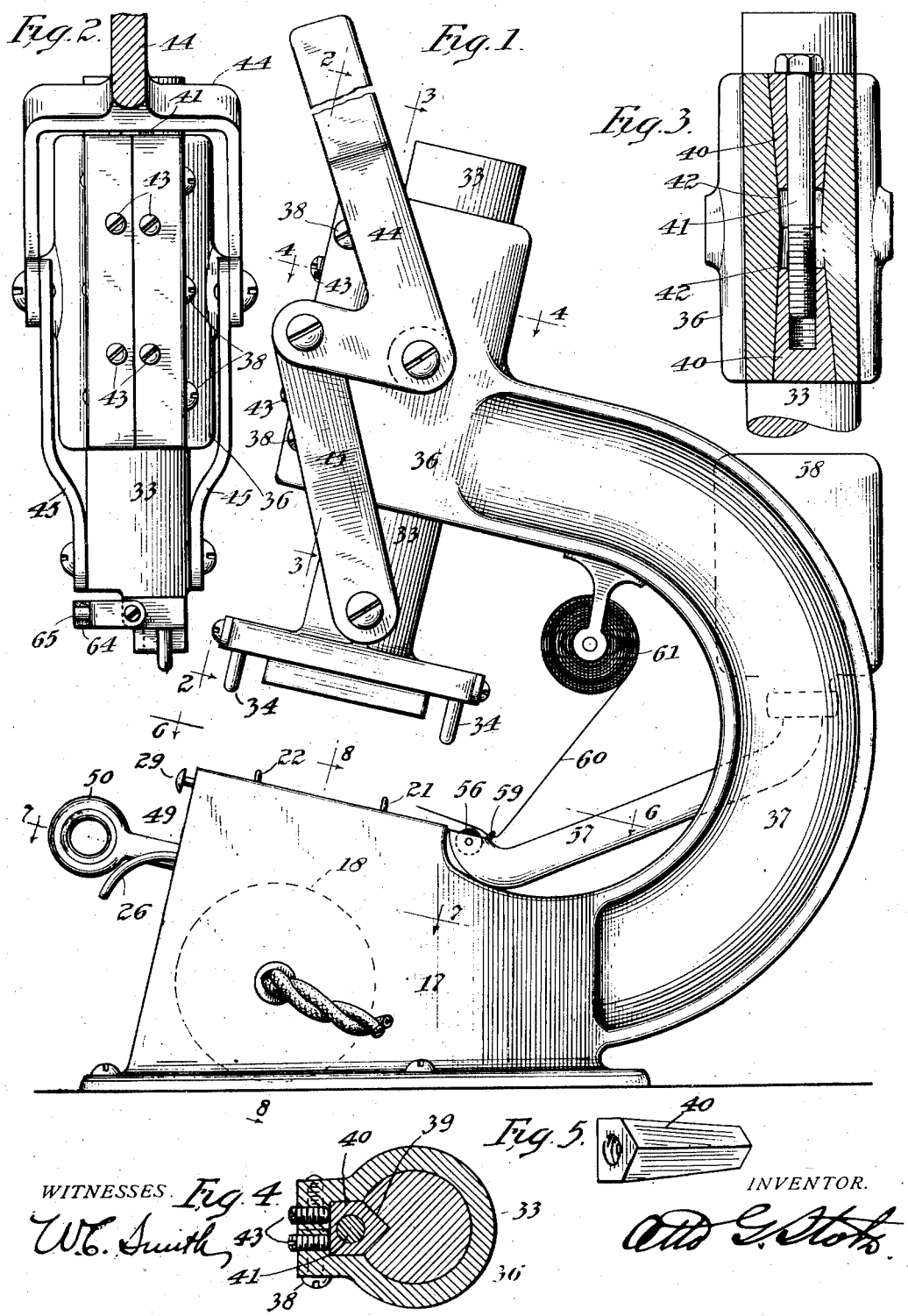

1,396,895.

Patented Nov. 15, 1921.

3 SHEETS—SHEET 2.

WITNESSES:

INVENTOR.

O. G. STOLZ.
FILM SPLICING DEVICE.
APPLICATION FILED DEC. 17, 1917.
1,396,895.
Patented Nov. 15, 1921.
3 SHEETS—SHEET 3.
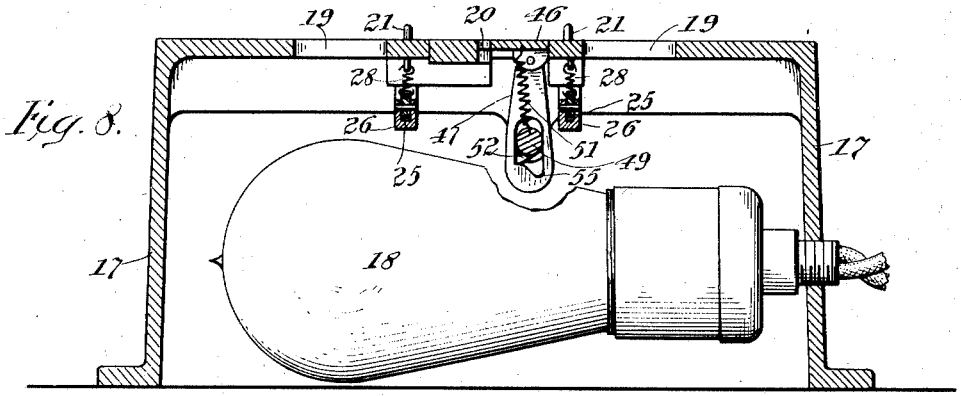
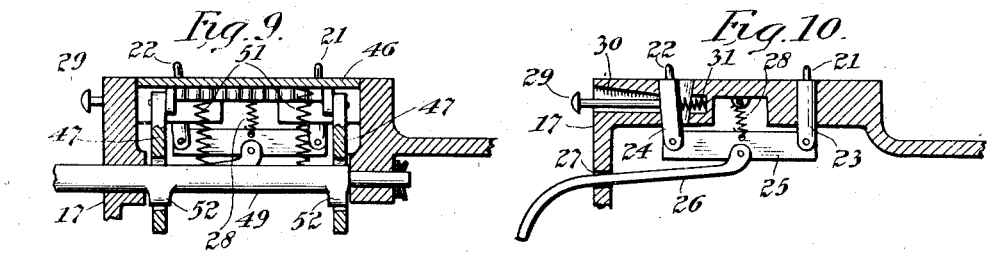
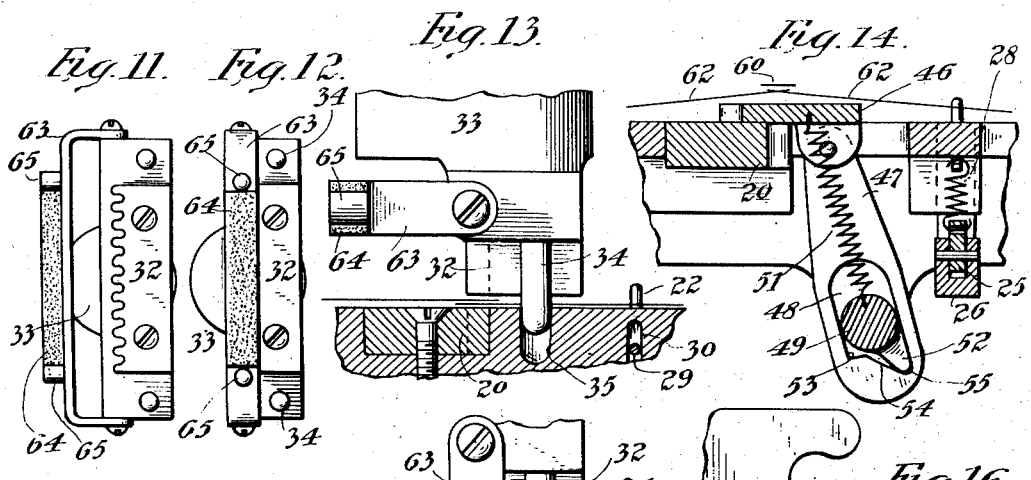
WITNESSES:
INVENTOR.

UNITED STATES PATENT OFFICE.

OTTO G. STOLZ, OF CHICAGO, ILLINOIS.

FILM-SPLICING DEVICE.

1,396,895.  Specification of Letters Patent.  Patented Nov. 15, 1921.

Application filed December 17, 1917. Serial No. 207,396.

*To all whom it may concern:*

Be it known that I, OTTO G. STOLZ, a citizen of the United States, and a resident of the city of Chicago, county of Cook, and State of Illinois, have invented certain new and useful Improvements in Film-Splicing Devices, of which the following is a specification.

Figure 6:
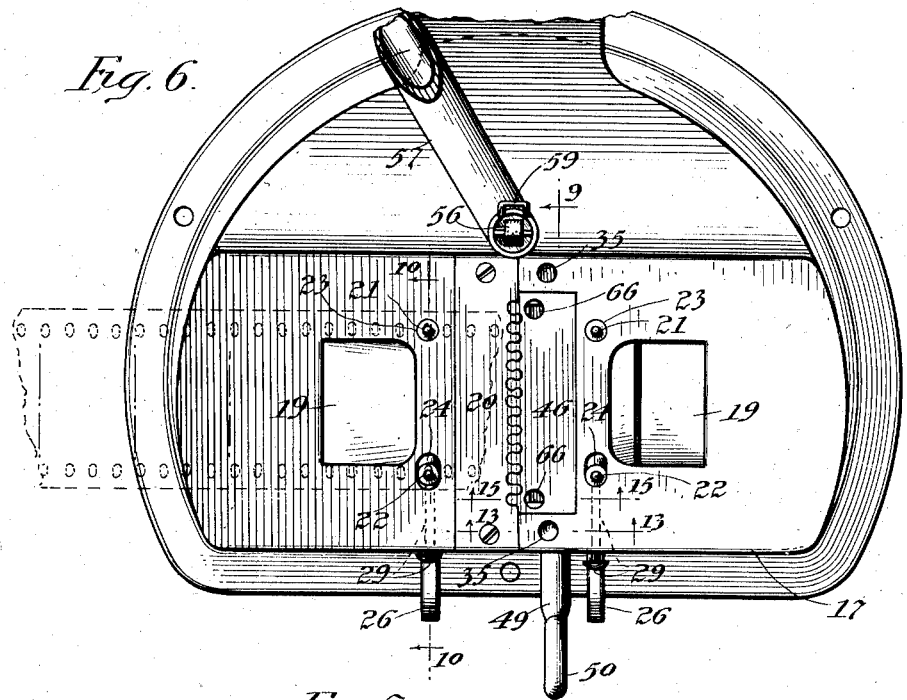
Figure 7:
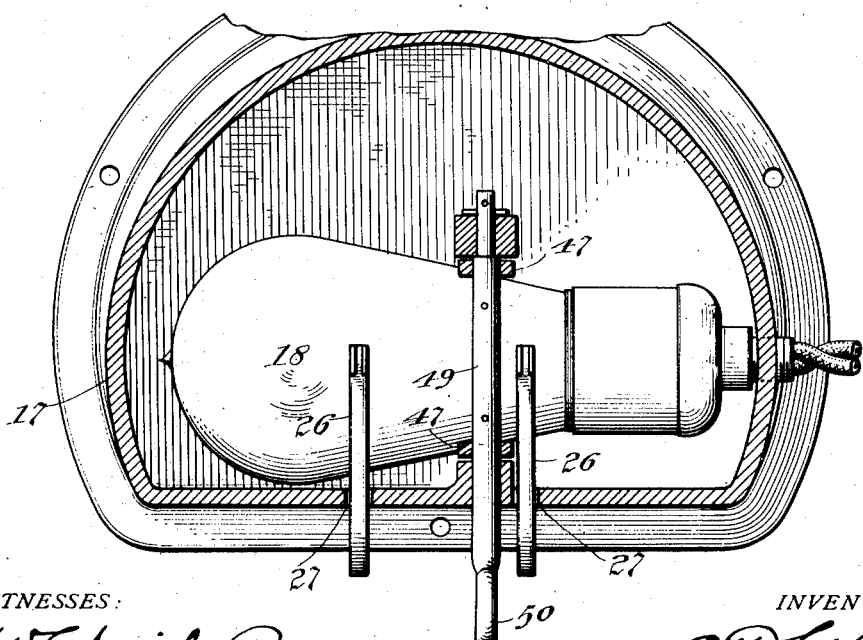

The invention relates to an improvement in devices for the splicing of moving picture films, and has for its object the provision of an improved device of this character, by means of which sections of such films may be readily spliced, or secured together in perfect alinement and relation with each other. The invention consists in the combinations and arrangements of parts hereinafter described and claimed. The invention will be best understood by reference to the accompanying drawings forming a part hereof, and in which Figure 1 is a side view of a device embodying the invention. Fig. 2 is a section taken substantially on line 2—2 of Fig. 1. Fig. 3 is a section taken substantially on line 3—3 of Fig. 1. Fig. 4 is a section taken on line 4—4 of Fig. 1. Fig. 5 a perspective view of one of two wedging feather sections employed in the device. Fig. 6 an enlarged section taken substantially on line 6—6 of Fig. 1. Fig. 7 an enlarged section taken substantially on line 7—7 of Fig. 1. Fig. 8 a section taken on line 8—8 of Fig. 1. Fig. 9 a section taken on line 9—9 of Fig. 6. Fig. 10 a section taken on line 10—10 of Fig. 6. Fig. 11 a bottom plan view of a movable die member employed in the device. Fig. 12 a view similar to Fig. 11 but showing the parts in a different relation. Fig. 13 an enlarged section taken on line 13—13 of Fig. 6. Fig. 14 an enlarged detail section illustrating means for operating a combined holding and compression plate employed in the device. Fig. 15 an enlarged section taken on 15—15 of Fig. 6, and Fig. 16 an enlarged top plan view of a portion of a stationary die member employed in the device.

The preferred form of construction as illustrated in the drawings comprises a hollow base 17 containing an ordinary electric light bulb 18, supplied with current from a suitable source. Two scene framing openings 19 are formed in the top of base 17, equally spaced on opposite sides of the medial cutting line of a stationary die member 20 and mounted flush with the top of base 17.

A pair of positioning pins 21—22 is arranged adjacent to the inner edge of each of the openings 19; said pins being mounted at the upper ends of plungers 23—24, respectively arranged to operate freely through the top of casing 17. Each pair of plungers 23—24 is carried by a saddle or yoke 25 pivoted to the inner end of an operating lever 26, extending loosely through a rocker bearing 27 in the front wall of base 17, the arrangement being such as to permit of the ready elevation or depression of the corresponding pins 21—22 to extend or retract the same.

Each of the saddles 25 is normally held in elevated position by means of a tension spring 28 and each of the plungers 24 carries a push rod 29 operating freely through a divergent opening or passage 30 in the base 17, a compression spring 31 being imprisoned behind each of the plungers 24 to press the corresponding pin 22 normally outwardly. Each pair of pins 21—22 is positioned from the medial cutting line of die member 20 the normal length of a scene on a picture film, so that when the feed perforations registering with the lines of division between the scenes on two film sections are placed over the pins, the lines of division of the next scene, each register over the medial cutting line of the die member 20. The push rods 29 permit of the ready inward swinging of the pins 22 to facilitate positioning of the film sections on said pins and the tensions in springs 31 tend to straighten up and bring the film sections into correct alinement with each other. When it is desired to remove the film sections, each pair of pins 21—22 may be simultaneously depressed and retracted to free the corresponding film section.

A cylindrical plunger 33 provided at its lower end with guide pins 34 arranged to operate in the guide recesses 35 in the base 17 is mounted to reciprocate in a split bearing sleeve 36 at the upper end of a curved bracket, or arm 37 on base 17. Clamping screws 38 are arranged in the sleeve 36 to permit of nicely adjusting the same to the plunger 33, and the plunger 33 is provided with a longitudinally extended V-shaped guide groove 39. Wedge shaped feather sections 40 are arranged in sleeve 36 to engage the guide groove 39, said feather sections being operatively positioned as shown and adjustedly secured together by means of an adjusting screw 41, passing freely through the upper feather section and threaded in the lower as best shown in Fig. 3. Converging guide grooves 42 are provided in bearing 36 for the accommodation of feather sections 40 and adjusting screws 43 are also provided in bearing 36 to bear against the outer faces of said feather sections. By this arrangement it will be seen that the feather sections and the clamping bearing may be readily adjusted to nicely fit the plunger 33 and guide the same in its movement.

The plunger 33 is operated by means of a bifurcated bell crank lever 44 pivoted at opposite sides of bearing 36 and connected with said plunger by means of links 45, as best shown in Figs. 1 and 2. A movable die member 32 is secured to the bottom of plunger 33, and is provided with a serrated cutting edge coöperating with a similarly serrated edge on the stationary die member 20, the said die members being shaped as best indicated in Fig. 16 to interlock with each other so as to cut serrated interlocking edges on film sections, which will interlock with each other to prevent longitudinal separation thereof.

A holding plate 46 is arranged to coöperate with the die member 20 having a serrated edge interfitting with the serrated edge thereof. Plate 46 is pivotally mounted at the upper ends of two rocker arms 47 provided with slots 48 sliding freely over a shaft 49 mounted in base 17 and provided with an operating handle 50, as shown. The plate 46 is also yieldingly connected with the shaft 49 by means of compression springs 51 normally forcing said plate upwardly. Lugs 52 are provided on shaft 49 in positions to operate in slots 48, said lugs being arranged to rest normally in notches 53 in said slots. The notches 53 are connected by cam surfaces 54 with notches 55 also adapted to receive said lugs. The arrangement is such that with the lugs 52 resting in notches 53, the holding plate 46 will be held flush with the top of die member 20 and in registration therewith. Upon turning the shaft 49 in a counter clock handwise direction until the lugs 52 pass into notches 55, the holding plate 46 will be elevated by the action of springs 51, whereupon further rocking of shaft 49 carries the plate 46 over the die member 20, as shown in Fig. 14, in which position the plate 46 is adapted to serve as a compression plate for cementing the ends of the film sections, as will appear more fully hereinafter. Upon turning the shaft 49 in an opposite direction, the plate 46 will be first rocked back to its normal initial position and then depressed by the action of the lugs 52 on the cam surfaces 54 of the slots 48, as will be readily understood.

The cement applying roller 56 is arranged adjacent the inner end of the die member 20, and is supplied with cement through a pipe 57, leading from a cement reservoir, as shown. A strip guide 59 is positioned at the roller 56 in the position to guide a binding strip 60 of celluloid from a spool 61 into operative relation with the die member 20, and holding plate 46, so as to overlie the inner edges of two film sections 62 held by the pins 21—22, cement being applied to the lower side of said strip during its movement. By this arrangement when the meeting edges of two film sections held by the pins 21—22 are cut by the dies 20—32 the severed ends will be automatically held in place by the holding plate 46, which will yield with the movable die, and the ends of the film sections will be interlocked against longitudinal movement. Then the holding plate 46 is thrown into the position indicated in Fig. 14, and a portion of the cemented strip 60 drawn out over the joint, as is shown. This portion of the binding strip is then pressed into place over the joint by means of a compression member 63 pivoted to the movable die member plunger 33 and carrying a rubber compression pad 64. Cylindrical plungers are arranged at each end of the pad 64 and are adapted to pass into die openings 66 in holding plate 46 to sever the ends of the binding strip. The compression member 63 is arranged to be swung into and out of operative relation, so that when the die 32 is to be used, it may be thrown into inoperative relation, and when the joint is to be finally bound it may be thrown into operative relation. In this manner the film sections 62 may be trimmed and secured together in perfect alinement and registration in a comparatively short time.

While I have illustrated and described the preferred form of construction for carrying my invention into effect, this is capable of variation and moderation without departing from the spirit of the invention. I, therefore, do not wish to be limited to the precise details of construction set forth, but desire to avail myself of such variations and moderations as come within the scope of the appendant claims.

I claim as my invention:

1. A film splicing device comprising a pair of laterally alining and laterally adjustable positioning pins arranged to engage opposite perforations in a film section; and means for trimming the end of a film section held by said pins, substantially as described.

2. A film splicing device comprising a pair of laterally alining positioning pins arranged to engage opposite perforations in a film section; means for moving one of said pins toward the other; a spring normally pressing said movable pin away from its mate; and means for trimming the end of a film section held by said pins, substantially as described.

3. A film splicing device comprising a pair of laterally alining and laterally adjustable positioning pins arranged to engage opposite perforations in a film section; means for simultaneously retracting both of said pins; and means for trimming the end of a film section held by said pins, substantially as described.

4. A film splicing device comprising a pair of laterally alining positioning pins arranged to engage opposite perforations in a film section; means for moving one of said pins toward the other; a spring normally pressing one of said pins away from its mate; means for simultaneously retracting both of said pins; and means for trimming the end of a film section held by said pins, substantially as described.

5. A film splicing device comprising means for holding two alining film sections; means for simultaneously trimming the adjacent ends of said sections to fit and interlock with each other; and means for applying pressure to said severed ends, substantially as described.

6. A film splicing device comprising means for holding two alining film sections; means for simultaneously trimming the adjacent ends of said sections to fit and interlock with each other; means for applying a strip of adhesive to said fitted ends; and means for simultaneously applying pressure to said severed ends and severing said strip, substantially as described.

7. A film trimming device comprising a stationary and a movable die member; and a yieldable holding member coöperating with said die members and arranged to hold a severed end against said movable die member, substantially as described.

8. A film trimming device comprising a stationary and a movable die member; and a yieldable spring held holding member coöperating with said die members and arranged to hold a severed end against said movable die member, substantially as described.

9. A film splicing device comprising a stationary and a movable die member; a yielding holding member coöperating with said die members and arranged to hold a severed end against said movable member; means for shifting said holding member over said stationary die member to serve as a compression plate; and a compression member on said movable die member shiftable into and out of operative relation with said compression plate, substantially as described.

10. A film splicing device comprising a stationary and a movable die member; a yielding holding member coöperating with said die member and arranged to hold a severed end against said movable die member; means for shifting said holding member over said stationary die member to serve as a compression plate; means for applying a strip of adhesive over said compression plate; and a combined compression and severing member on said movable die member shiftable into and out of operative relation with said compression plate, substantially as described.

11. A film splicing device comprising two pairs of laterally alining positioning pins arranged to engage opposite perforations in a film section; means for moving one of each pair of said pins toward the other; a spring normally pressing one of each pair of said pins away from its mate; means for simultaneously retracting each pair of said pins; a stationary serrated die member located at a predetermined distance between said pairs of pins; a movable serrated die member coöperating and interlocking with said stationary die member; a spring held yieldable holding member coöperating with said die members and arranged to hold severed film ends to said movable die member; means for shifting said holding member onto said stationary die member to serve as a compression plate; a binding strip guide arranged to direct a binding strip over said stationary die member; cement applying means arranged to apply cement to a strip passing through said guide; and a combined compression and severing member on said movable die member and shiftable into and out of operative relation with said compression plate, substantially as described.

OTTO G. STOLZ.

Witnesses:
L. E. Dowson,
Geo. H. Auer.